Figure 1:
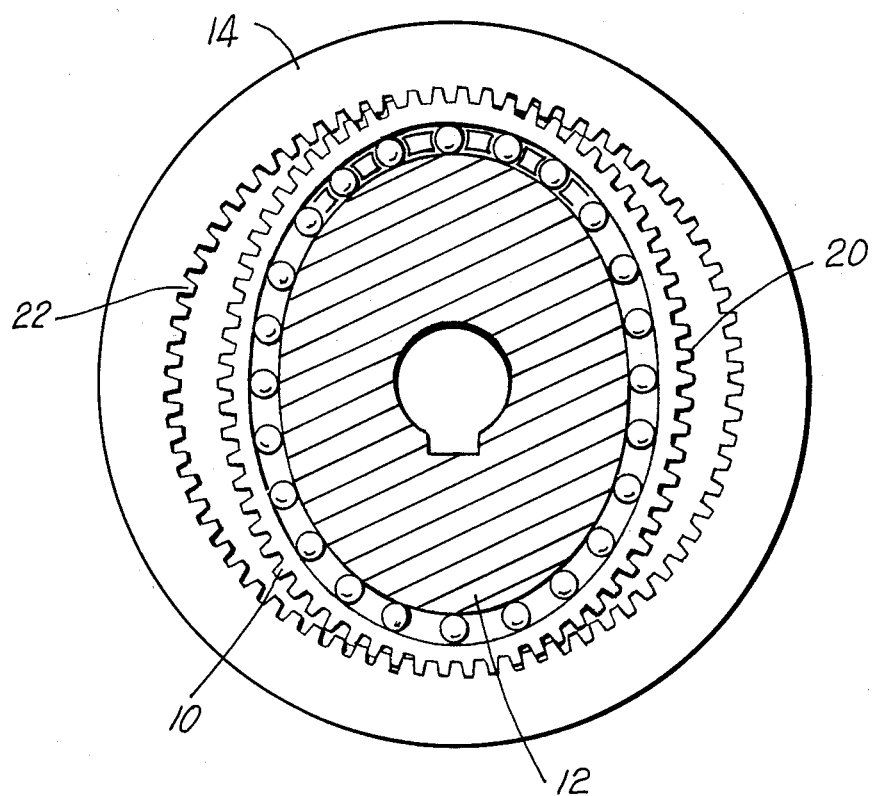

United States Patent [19]

Carlson

[11] Patent Number: 4,817,457
[45] Date of Patent: Apr. 4, 1989

[54] UNIFORM WALL FLEXSPLINE

[75] Inventor: John H. Carlson, Danvers, Mass.

[73] Assignee: Quincy Technologies, Inc., New Haven, Conn.

[21] Appl. No.: 897,695

[22] Filed: Aug. 18, 1986

[51] Int. Cl.$^4$ .................. F16H 33/00; F16H 35/00
[52] U.S. Cl. ......................... 74/640; 29/159.2
[58] Field of Search .............. 74/640, 804; 1/805, 1/DIG. 11; 29/159.2

[56] References Cited

U.S. PATENT DOCUMENTS

| | | | |
|---|---|---|---|
| 1,941,994 | 1/1934 | Muschong | 29/159.2 |
| 2,123,265 | 7/1938 | Wattle | 29/159.2 |
| 2,654,944 | 10/1953 | Wilson | 29/159.2 |
| 2,943,513 | 7/1960 | Musser | 74/640 |
| 3,206,840 | 9/1965 | Carlson | 29/159.2 |
| 3,555,929 | 1/1971 | Hossfeld | 74/640 |
| 3,604,287 | 9/1971 | Humphreys | 74/804 X |
| 3,720,989 | 3/1973 | Ramond | 29/159.2 |
| 3,884,063 | 5/1975 | Tersch | 29/159.2 X |
| 4,524,639 | 6/1985 | Carlson | 74/640 |
| 4,625,582 | 12/1986 | Kiryu | 74/640 |

FOREIGN PATENT DOCUMENTS

| | | | |
|---|---|---|---|
| 1203082 | 10/1965 | Fed. Rep. of Germany | 74/640 |
| 4541172 | 12/1970 | Japan | 74/640 |
| 2060123 | 4/1981 | United Kingdom | 74/640 |

OTHER PUBLICATIONS

Manufcturing Processes, Roberts et al., 1977, pp. 381–387.

Primary Examiner—Dirk Wright
Attorney, Agent, or Firm—Donald N. Halgren

[57] ABSTRACT

A strain wave gearing device comprising a ring gear having internal axially extending teeth and a strain gear produced from a strain gear blank having constant thickness to the cylindrical and diaphragm portions. The cylindrical portion has external axially extending teeth extending around an annular portion adjacent the open end of the strain gear for engaging with the internal teeth of the ring gear (the number of external teeth on the strain gear being different than the number of internal teeth on the ring gear) and a wave generator is located within and matingly engages with the strain gear. The wave generator adapted to be rotatively driven relative to the strain gear whereby relative rotational movement will occur between the strain and ring gears.

9 Claims, 2 Drawing Sheets

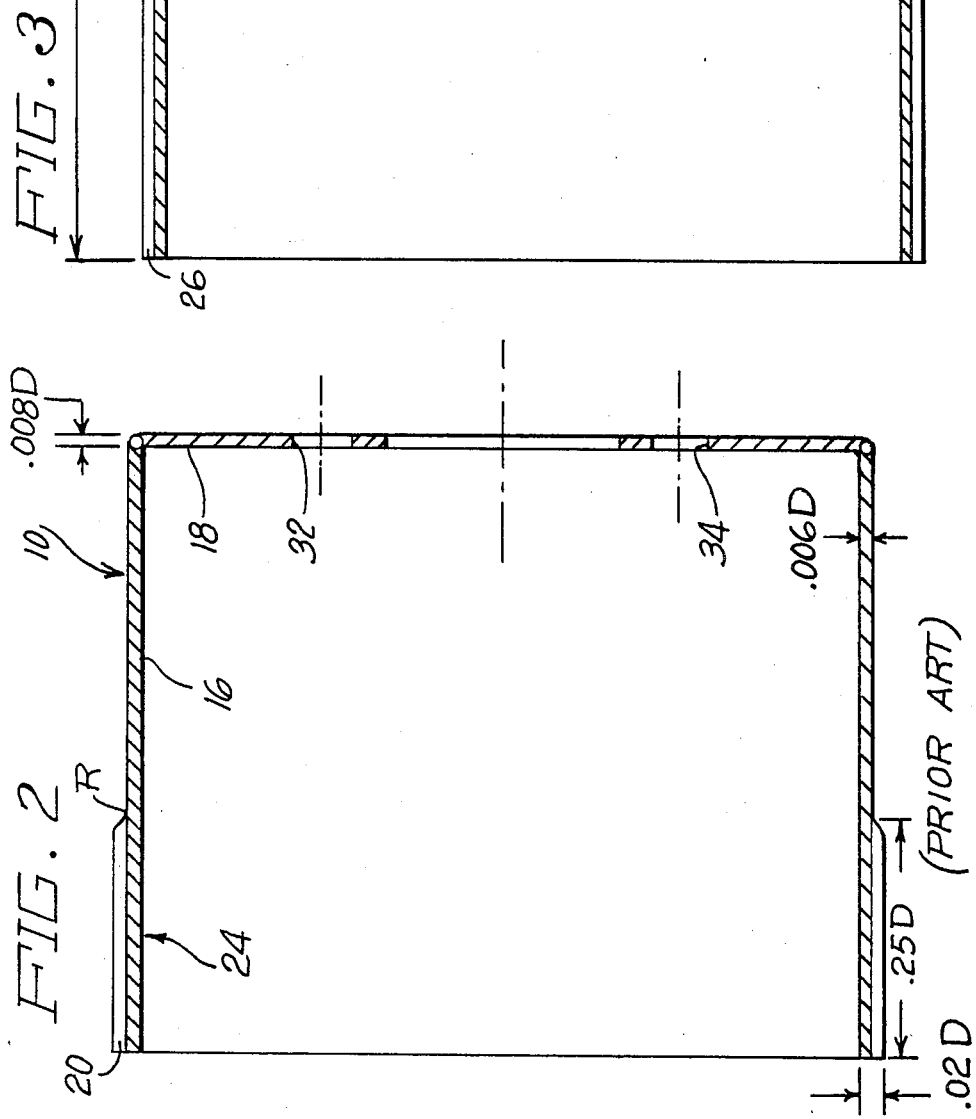

UNIFORM WALL FLEXSPLINE

This invention discloses an improved strain gear for use in strain wave gearing. It embodies a strain gear made from a strain gear blank having a uniform wall thickness of 0.015 to 0.02D, where D is the strain gear pitch diameter. This type strain gear blank is less costly than the prior art strain gear blanks and has lower operating stresses in the diaphragm area.

Strain wave gearing employs three concentric components to produce high mechanical advantage and speed reduction based on the principle of nonrigid body mechanics. An elliptical wave generator is inserted into a cylindrical strain gear distorting the strain gear into an elliptical form. The strain gear is in the form of a flexible tubular member open at one end with external axially extending teeth around the periphery adjacent the opening. These teeth mesh with the internal axially extending teeth on a ring gear or circular spline. The number of teeth in the ring gear usually exceed by two the number of teeth in the strain gear. Since the teeth on the nonrigid strain gear and the teeth in the rigid circular spline are in continuous engagement along the major axis of the elliptical shape, and since the strain gear has two teeth fewer than the circular spline, one revolution of the wave generator, as the input, causes relative motion between the strain gear and the circular spline equal to two teeth. With the circular spline fixed, the strain gear will rotate in the opposite direction to the input at a reduction ratio equal to the number of teeth on the strain gear divided by two. The strain gear may also be the fixed member and the circular spline would be the output member and rotate in the same direction as the input.

Strain wave gearing was first disclosed in U.S. Pat. No. 2,906,143 granted Sept. 29, 1959. In this disclosure, the cylindrical strain gear was depicted as a toothed member connected to a thinner walled tubular portion. The importance of the diaphragm thickness was not recognized at that time. Consequently, the diaphragm portion was either omitted or grossly shown out of proportion. During the development period of strain wave gearing by the assignee of this patent, a strain gear evolved having three different wall thicknesses. There was a cylindrical portion including an annular gear blank portion having a thickness, in a two lobed configuration, almost always slightly in excess of 2% D where D is the pitch diameter of the strain gear and the remaining tubular portion had a thickness of 0.6% D. Welded to the cylindrical portion to close one end was a plate or diaphragm having a thickness of 0.8% D. The cylindrical portion was made from a cylindrical blank. The blank was machined to have a stepped configuration and a large radius blended the tubular and gear blank portions. The gear teeth were then defined in the annular gear blank.

The tubular portion of the strain gear was made thin to minimize the force to deflect the strain gear, but maintained adequate thickness to transmit the output torque and to facilitate manufacturing. The diaphragm was made thin to minimize the deflection stress associated with the inherent scalloping action yet had adequate thickness to transmit the output torque. The product was improved by increasing the diaphragm thickness to 1% to 2% of D. For details of this construction, see U.S. patent application Ser. No. 405,454, filed on Aug. 5, 1982 and now abandoned. Although increasing the thickness increased the deflection stress associated with axial deflection or scalloping, it reduced the stress associated with the axial force acting on it resulting in a more favorable stress condition.

It is an object of the present invention to produce a novel strain gear from a strain gear blank having a uniform thickness.

Other objects and advantages of the present invention will become apparent from the following portion of this specification and from the accompanying drawings which illustrate in accordance with the mandate of the patent statutes, a preferred embodiment incorporating the principles of the invention.

Referring to the drawings:

FIG. 1 is a front view of strain wave gearing illustrating its three components, FIG. 2 is a side view in cross-section of a conventional strain gear, and FIG. 3 is a similar view of the strain gear made in accordance with the teachings of the present invention.

Strain wave gearing has three main components shown in FIG. 1, namely, a strain gear 10 which conventionally is in the form of a cylinder closed at one end, a wave generator 12 and a ring gear 14. The open end of the strain gear 10 can be deflected into an elliptical configuration by the elliptical wave generator 12. The external gear teeth 20 at the open end of the strain gear 10 engage with internal gear teeth 22 of the ring gear 14 along each side of the major axis of the elliptical shape. Since the number of teeth on the strain gear is different than the number of teeth on the ring gear, rotation of the wave generator will effect relative motion between the strain gear 10 and the ring gear 14.

A conventional strain gear 10, is illustrated in FIG. 2. The strain gear blank can be produced by machining the cylindrical and diaphragm portions 24 as an integral part; albeit, typically it is produced by welding a machined cylindrical member 16 to a flat circular plate or diaphragm 18. The diaphragm had a thickness of 0.008D. A pilot diameter 32 and screw holes 34 are provided for attachment purposes. The cylindrical member had a constant bore diameter over the length of the part, however, the outside diameter was stepped to produce two different wall thicknesses. A large radius R provides a gradual transition between the two diameters, although a tapered section in the form a truncated cone would provide the same function. The greater wall thickness which is in excess of 0.02D, extends axially for approximately 0.25D from one end, and forms the gear blank area 24 into which gear teeth 20 are produced. The remainder of the cylindrical member is the tubular portion 16 and has a wall thickness of 0.006D. The diaphragm 18 is welded to the end of the cylindrical member at the tubular portion. In FIG. 2, the strain gear is illustrated connected to a bearing supported shaft 30.

In accordance with the teachings of the present invention, the strain gear blank (FIG. 3) is a deep drawn cylinder with a closed end. The formed strain gear blank has an essentially uniform wall thickness of 0.015 to 0.02D. Subsequently, the closed end or diaphragm 18 is processed by stamping or machining, to define a pilot diameter 32 and holes 34 on a bolt circle, to provide an attachment means. The strain gear blank is then trimmed to its intended axial length L and external gear teeth 20 will be defined by forming or machining adjacent the open end of the formed blank.

When the gear teeth 26 are generated by a method, such as hobbing, the axial length of the "gear full depth" or "full depth of gear" should be greater than the length of the mating ring gear. However, to improve the flexibility of the strain gear, the gear teeth may be extended a greater distance along the strain gear blank and may be extended the entire length of the strain gear.

When the gear teeth are to be generated by a shaping operation, a 36 relief would be necessary on the strain gear blank O.D. directly behind the teeth 26 to allow the cutter to complete its down stroke in this location. The axial width of this relief should be adequate to allow for cutter run out. An important consideration is to blend the wall thickness in the area of the relief with the wall thickness on either side to produce a gradual change in the neutral axis of the part minimizing the stress concentration factor.

The gear teeth could also be roll formed which would result in a slight enlargement of the outer diameter of the geared portion. Enlargement of the outer diameter of the gear tooth portion also occurs when the teeth are formed in a die having internal teeth.

The strain gear blanks of uniform wall thickness can be made from any suitable material. However, since most of the materials that are readily formed without intermediate annealing have low mechanical properties it may be desirable to subject the completed strain gear to heat treating or other processes to enhance its mechanical properties.

What is claimed is:

1. A strain wave gearing device comprising a ring gear having internal, axially extending teeth,
    a cup shaped strain gear made from a strain gear blank having a uniform thickness throughout from about 0.015D to 0.02D where D is the blank bore diameter,
    external axially extending teeth means defined around the open end of the cylindrical portion of said strain gear blank for engaging with the internal teeth of said ring gear, the number of external teeth on said strain gear being different than the number of internal teeth on said ring gear, said cylindrical portion having the same thickness as a diaphragm portion of said strain gear blank,
    attachment means defined in the diaphragm portion of said strain gear blank, and
    a wave generator located within said strain gear, said wave generator adapted to be rotatively driven relative to said strain gear whereby relative rotational movement will occur between said strain and ring gears.

2. A strain wave gearing device according to claim 1, wherein said external axially extending strain gear teeth wire roll formed.

3. A strain wave gearing device according to claim 2, wherein said external axially extending strain gear teeth were defined by hobbing.

4. A strain wave gearing device according to claim 1, wherein said external axially extending strain gear teeth were defined by shaping.

5. A strain wave gearing device according to claim 1, wherein said external axially extending strain gear teeth were defined by forming within a die having internal teeth.

6. A strain wave gearing device as recited in claim 1, wherein said strain gear is of uniform thickness except for said toothed portion.

7. A process for making a strain wave flexspline gearing device utilizable for rotatively transmitting torque through a flexible wall thereof, comprising the steps of:
    deep drawing a uniformly thick strain gear blank into a cup-shaped cylinder having a closed end and an open end, the thickness of the gear blank being 0.015 to 0.02 times the diameter of the cylinder: and forming gear teeth on the periphery of said open end.

8. The process for making a strain wave flexspline gearing device as recited in claim 7, including:
    trimming the axial length of said uniformly thick walled cup-shaped cylinder.

9. The process for making a strain wave gearing device as recited in claim 8, including:
    making attachment holes in said closed end of said uniformly thick walled cup-shaped cylinder, to facilate attachment in said device.

* * * * *